United States Patent Office 2,864,681
Patented Dec. 16, 1958

2,864,681
PLANT GROWTH STIMULATION

Louis G. Nickell, Brooklyn, N. Y., assignor to Chas. Pfizer & Co., Inc., Brooklyn, N. Y., a corporation of Delaware No Drawing. Application May 25, 1954
Serial No. 432,312

2 Claims. (Cl. 71—2.5)

This invention is concerned with a process for the stimulation of plant growth and with novel compositions for this purpose. In particular, it is concerned with the stimulation of plant growth by means of the synthetic organic compound known as isonicotinic acid hydrazide or isoniazid.

A variety of materials have been suggested for use as plant growth stimulants. In addition to the commonly available materials such as commercial fertilizers, various plant hormones have been suggested for this purpose. These have had greater or lesser success in practice and show considerable variation in their effect on various plants.

It has now been found that isoniazid, which is commonly used as an antituberculous therapeutic agent, unexpectedly displays a very considerable stimulation upon plant growth. In particular, the material, when applied to seeds in the form of a dilute solution in water, or diluted with solid inert or active materials, is capable of exerting an effect which results in a very great acceleration of the rate and amount of growth of many plants. The material may be applied to the seeds by spraying, dipping, etc. Alternatively, the materials, suitably diluted, may be applied to soil before or after planting the seeds.

The plant stimulation effect described above has been demonstrated with various species of plants including radish, soybean, and tomatoes. In particular, the material is extremely effective in accelerating the rate of germination of such seeds. This increase in germination rate and size of the seedling produced is of considerable value in assuring early and rapid growth of valuable food-producing plants. Isoniazid has also been shown to be capable, for example, of stimulating the growth of the small plant, Lemna minor, which commonly grows on still bodies of water such as ponds.

A variety of compositions may be prepared incorporating a minor proportion of isoniazid to assist in the stimulation of plant growth. Such compositions may be dilute aqueous solutions of the compound. Solutions as dilute as 0.1 part per million parts by weight in water have shown a very definite stimulatory effect upon the germination and amount of growth of seeds. Concentrations as high as 50 parts per million are quite useful, although appreciably higher concentration than this may be wasteful. Not only may isoniazid be diluted with water for application to seeds and young plants to stimulate their growth, but the active material may be diluted with inert substances, such as diatomaceous earth, finely divided peat moss, commercial fertilizers, gypsum, ground limestone, fuller's earth, and other substances of this nature.

It should be emphasized that, when the term "isoniazid" is used, it is meant to include not only the free base, isonicotinyl hydrazine, but also various salts of this compound, such as the hydrochloride, sulfate, phosphate, hydrobromide, and so forth. These materials being somewhat more soluble in water may be more readily dissolved and thus have some advantages.

The following examples are given by way of illustration and are not to be considered as the sole embodiments of this invention. It is to be understood that protection hereof is only limited by the specific wording of the appended claims.

Example I

In the following table is given the results of an experiment in which Lemna minor (duckweed) was grown from a rosette of leaves in nutrient solutions containing varying concentrations of isoniazid. In the first column is given the concentration of the isoniazid solution used. In the second column is given the increased wet weigth of the Lemna minor in solutions of various isoniazid concentrations as compared to control experiments in which no isoniazid was used. The second column is the percent of increase at the end of three weeks and the third column is the percent of increase at the end of eight weeks.

| Concentration of Isoniazid, p. p. m. | 3 weeks (percent) | 8 weeks (percent) |
|---|---|---|
| 1 | +50 | +25 |
| 5 | +70 | +160 |
| 10 | +130 | +210 |
| 20 | +145 | +270 |

It is apparent from this table that isoniazid exerts a very great stimulatory effect upon the growth of the plant, Lemna minor, even when used in concentrations as low as one part per million. The composition of the nutrient solution used is these examples is as follows:

| | | |
|---|---|---|
| $KNO_3$ | M | 0.002 |
| $Ca(NO_3)_2$ | M | 0.003 |
| $KH_2PO_4$ | M | 0.001 |
| $MgSO_4$ | M | 0.001 |
| $CaCl_2$ | M | 0.003 |
| KCl | M | 0.002 |
| $MgCl_2$ | M | 0.001 |
| Sucrose | percent | 2 |
| Thiamine | $\gamma/1$ | 100 |
| Pyridoxin | $\gamma/1$ | 800 |
| Nicotinamide | $\gamma/1$ | 800 |
| B | p. p. m | 0.1 |
| Mn | p. p. m | 0.1 |
| Zn | p. p. m | 0.3 |
| Cu | p. p. m | 0.1 |
| Mo | p. p. m | 0.1 |
| Fe | p. p. m | 0.5 |

Example II

Radish seeds in groups of 50 were subjected to a standard germination test on filter paper moistened with water and with varying concentrations of aqueous isoniazid solution. The test was conducted at 28° C. for four days. At the end of this time the total weight of the sprouted seeds in each group was determined.

| Concentration of Isoniazid, p. p. m. | Total Weight of Sprouted Seeds, grams |
|---|---|
| 0 | 2.2 |
| 0.1 | 2.5 |
| 1 | 2.7 |
| 10 | 2.5 |
| 50 | 2.5 |

It is apparent that concentrations even as low as 0.1 part per million cause the production of larger seedlings. Increase in the concentration of isoniazid used exerts a slightly greater effect at one part per million, but is not more effective at higher concentrations.

Example III

Groups of 50 soybean seeds were each subjected to the same type of germination test as described in Example II. The following table summarizes the results:

| Concentration of Isoniazid, p. p. m. | Weight of Sprouted Seeds (4 days), grams |
|---|---|
| 0 | 11.9 |
| 0.1 | 12.2 |
| 1 | 12.1 |
| 10 | 12.4 |
| 50 | 12.9 |

It is apparent from this table that isoniazid exerts a very definite stimulatory effect upon the germination of soybean seeds and that this effect increases with increasing concentration, at least up to 50 parts per million in water.

Example IV

A germination test was conducted with groups of tomato seeds containing 100 seeds each. The experiment was conducted under exactly the same conditions as described above in Example II. In the following table is summarized the results:

| Concentration of Isoniazid, p. p. m. | Weight of Sprouted Seeds, grams |
|---|---|
| 0 | 2.0 |
| 0.1 | 2.6 |
| 1 | 2.0 |
| 10 | 2.4 |
| 50 | 2.4 |

It is apparent from this table that isoniazid in dilute solution generally exerts a definite stimulatory effect upon the sprouting tomato seeds at various concentrations up to 50 parts per million.

What is claimed is:
1. A process for stimulating the germination of seeds which comprises contacting said seeds with a composition containing between about 0.1 and 50 p. p. m. of isoniazid and a carrier therefor.
2. A process for stimulating the germination of seeds which comprises contacting said seeds with a dilute aqueous solution containing between about 0.1 and 50 parts by weight of isoniazid per million parts of water.

References Cited in the file of this patent

UNITED STATES PATENTS

| 2,596,069 | Fox | May 6, 1952 |
| 2,632,698 | Stewart | Mar. 24, 1953 |
| 2,749,231 | Ligett et al. | June 5, 1956 |

OTHER REFERENCES

Deysson et al.: "Chemical Abstracts," vol. 47, 1953, column 9428(d).

Bustinza et al.: "Chemical Abstracts," vol. 48, 1954, column 8333(a), abstract of article in "Antibiotics and Chemotherapy," vol. 3, pages 793-7, 1953.

Horii et al.: "Chemical Abstracts," vol. 46, 1952, column 9657(f); abstract of article, "Anti-Bacterial Activity of N-Isonicotinic Acid Hydrazide," in "J. Pharm. Soc." Japan 72, 971-2 (1952).

Marco et al.: "Chemical Abstracts," vol. 46, 1952, column 10288(h), abstract of article in "Sperimentale" (Italy), 102, 93-104 (1952).

Garis et al.: "Chemical Abstracts," vol. 47, 1953, col. 10067(b), abstract of article "Action of Isonicotinic Acid Hydrazide on Growth and Glucide Content of Carrot Tissue" in "Compte Rend. Soc. Biol.," 1890-4, 1952.